Dec. 25, 1951      F. F. HAUPTMAN      2,579,570
GYROSCOPE AND PENDULUM CONTROL SYSTEM FOR AIRPLANES
Filed Jan. 29, 1946      3 Sheets-Sheet 1
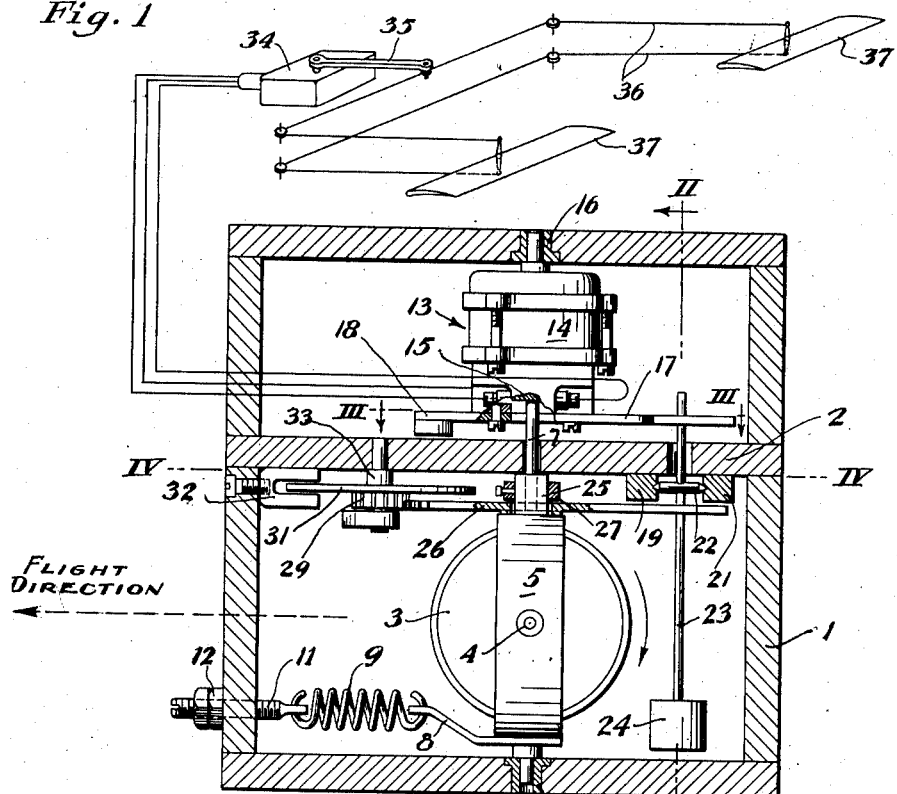
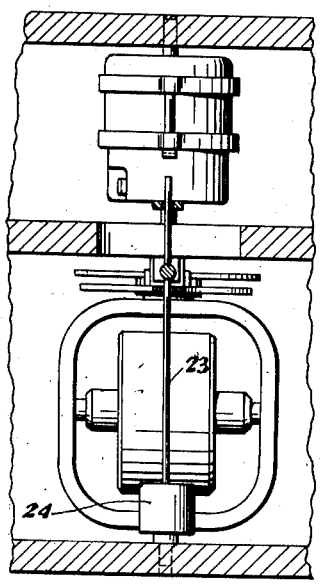
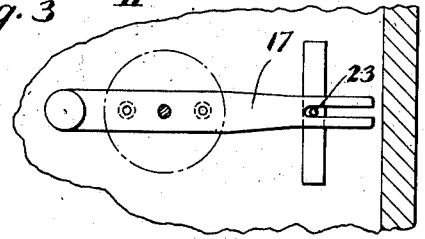
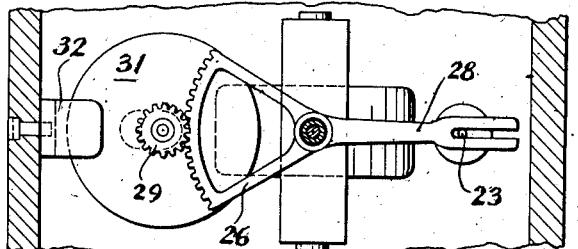
INVENTOR.
FREDERIC F. HAUPTMAN
BY
*Myron J. Seibold*
ATTORNEY

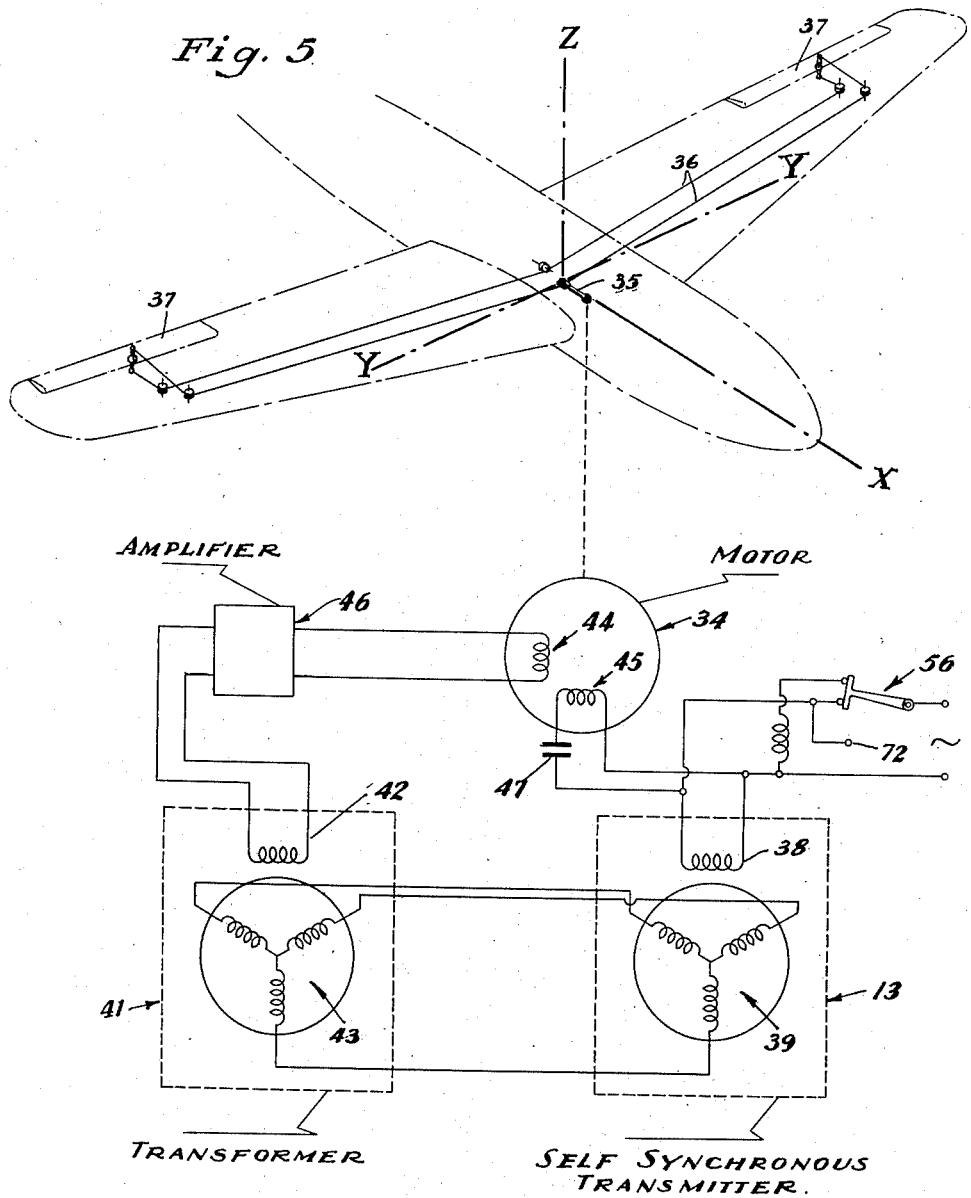

Dec. 25, 1951     F. F. HAUPTMAN     2,579,570
GYROSCOPE AND PENDULUM CONTROL SYSTEM FOR AIRPLANES
Filed Jan. 29, 1946     3 Sheets-Sheet 3
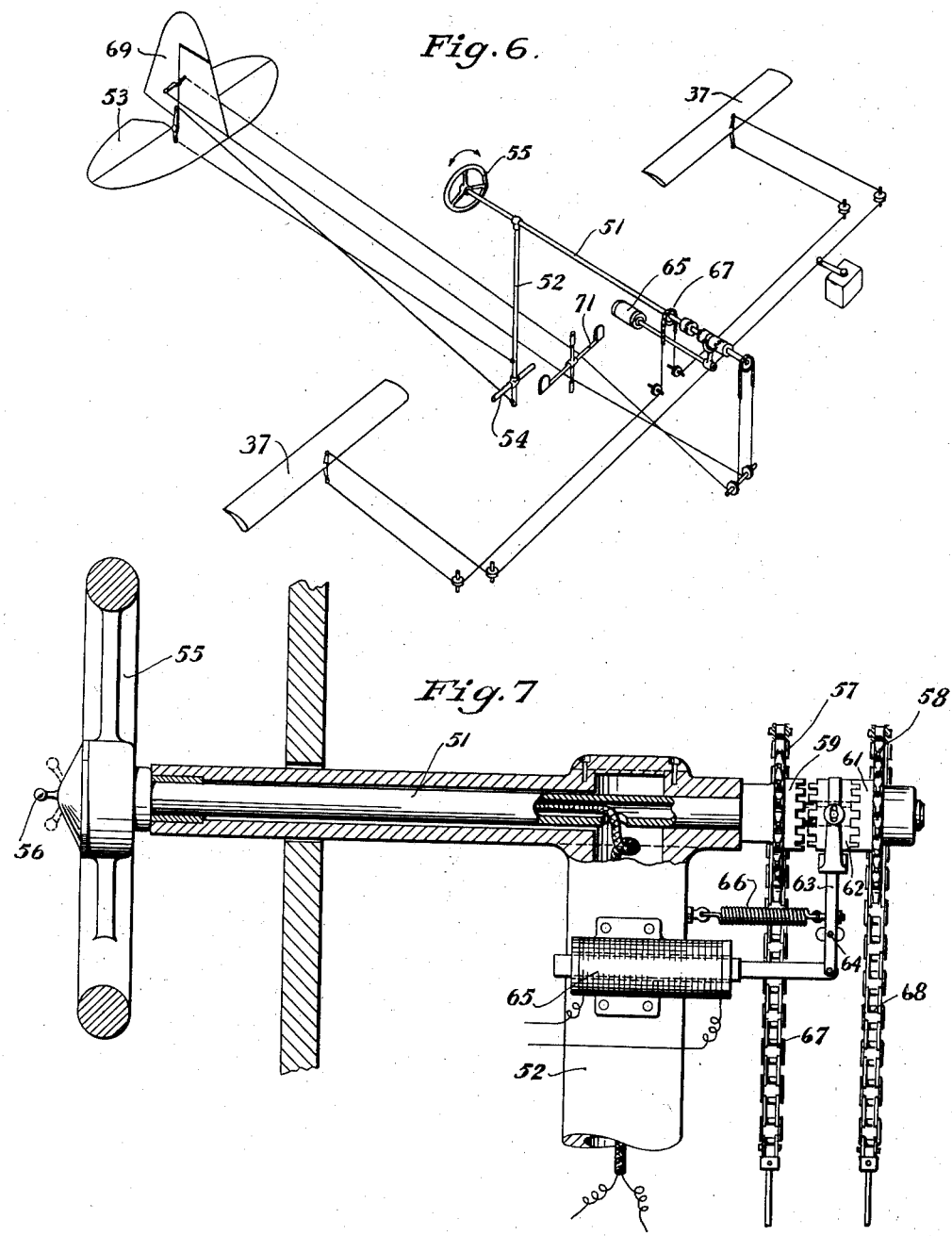
INVENTOR
FREDERIC F. HAUPTMAN
BY
ATTORNEY Patented Dec. 25, 1951

2,579,570

UNITED STATES PATENT OFFICE 2,579,570

GYROSCOPE AND PENDULUM CONTROL SYSTEM FOR AIRPLANES

Frederic F. Hauptman, Rego Park, N. Y., assignor, by mesne assignments, to Kollsman Instrument Corporation, Elmhurst, N. Y., a corporation of New York Application January 29, 1946, Serial No. 644,137

11 Claims. (Cl. 244—79)

1

This invention relates to automatic controls for aircraft and has for its object the provision of apparatus for automatically controlling the ailerons of an airplane to maintain proper flight attitude.

Another object of the invention is to provide an aileron control for airplanes which will automatically move the ailerons to compensate for aircraft roll.

Another object of the invention is the provision of an aileron control which will automatically apply the correct movement for proper banking of the airplane in a turn.

Another object of the invention is the provision of an automatic aileron control which will minimize the tendency to over control and hunt.

Other objects and features of the invention will be readily apparent to those skilled in the art from the specification and appended drawings illustrating certain preferred embodiments in which:

Figure 1 is a side elevational view of the controlling apparatus showing diagrammatically its application to the ailerons of an airplane.

Figure 2 is a partial sectional view on line II—II of Figure 1.

Figure 3 is a partial sectional view on line III—III of Figure 1.

Figure 4 is a partial sectional view on the line IV—IV of Figure 1.

Figure 5 is a diagrammatic representation of the electrical circuit and the application of the operating motor to the ailerons of an airplane.

Figure 6 is a schematic representation of a system for optionally providing for two way or three way control of the airplane.

Figure 7 is an enlarged detailed showing of the control of Figure 6.

In the operation of an airplane with conventional three way controls, it is necessary for the pilot to be constantly applying aileron control not only for desired changes in course, but to correct for involuntary movements of the airplane caused by disturbances in the air. Whether returning to course or correcting for plane roll, the application of aileron control must be constantly carried out in flying the airplane. Also, in the event of a desired change in course, it is necessary to properly bank the plane to prevent slip or skid. With the automatic control of the present invention, it is possible to forego the aileron control and operate the airplane with a two way control, as with rudder and elevator. It is contemplated that the automatic control as installed may be made optional with the pilot so that he can return to the conventional three way control if desired. Such an arrangement is illustrated in Figures 6 and 7. As illustrated in the drawing, the control device is embodied within a casing 1 containing a mounting platform 2. Within the casing is disposed a gyroscopic wheel 3 rotating in bearings 4 in a frame 5 mounted for rotation about a single axis in the bearing 6. The upper portion of the frame 5 is supported by connection to the shaft 7. The lower portion of frame 5 is provided with an arm 8 to which is connected a spring 9, the tension of which is adjustable through an eye bolt 11 and nut 12. Above the platform 2 is mounted a self-synchronous transmitter 13 having a stator body 14 and a rotor 15, the rotor 15 being mounted upon the shaft 7 which is rigidly connected to the frame 5. The stator body 14 is also adapted for rotation, being supported at its upper end in bearing 16 in housing 1.

The lower portion of the stator body 14 is rigidly connected to a forked arm 17 having a counterweighted extension 18. The shaft 7 passes freely through an opening in the arm 17. Depending from the platform 2 are bearings 19 and 21 in which is pivoted a shaft 22 carrying an elongated rod 23 at the bottom of which is attached a weight 24 to form a pendulum. The upper end of the rod 23 is disposed within the form of lever 17 as shown more particularly in Figure 3. The frame 5 is provided with a hub 25 about which is rotatably mounted a sector 26 freely rotatable about the hub 25 and maintained in place by a collar 27. The sector 26 has an arm extension 28 provided with a fork at its end within which is received the rod 23 as more particularly shown in Figure 4. Sector 26 is provided with gear teeth meshing with a gear wheel 29 to which is attached a conducting disk 31 disposed between the legs of a U-shaped permanent magnet 32 mounted on the housing wall. The gear wheel 29 and disk 31 are pivotally mounted upon a shaft 33 supported in the platform 2.

The self-synchronous transmitter 13 is of standard form having a single phase rotor winding and a three phase stator winding and the rotor is energized from an alternating current source, not shown. The three phase output of of the stator winding is illustrated in Figure 1 as being connected through discontinuous wiring, including additional equipment, to an operating motor 34 having an arm 35 connected to the cables 36 operating the ailerons 37 of the airplane.

The electrical circuit control is illustrated in Figure 5 in which the self-synchronous transmitter 13 is diagrammatically illustrated with its single phase rotor winding 38 and its three phase stator winding 39. A single phase-three phase transformer is utilized which is substantially the same in form as the self-synchronous transmitter 13 although in use the rotor and stator are relatively stationary. This transformer which is of the self-synchronous type is illustrated at 41 as having a single phase winding 42 and a three phase winding 43. The operating motor 34 is shown as provided with a two phase winding represented at 44 and 45. A standard amplifier is indicated at 46. The winding 45 of the motor 34 is energized from the alternating current source through the phase rotating condenser 47. The output of the three phase winding 39 of the self-synchronous transmitter 13 is connected to the three phase winding 43 of the transformer 41. The output of the single phase winding 42 of the transformer 41 is connected through the amplifier 46 to the winding 44 of the rotor 34. When the rotor 15 and the stator 14 of the self-synchronous transmitter 13 are in their normal neutral position, no voltage will be generated in the winding 42. This voltage null point may be obtained by the relative positioning of the rotor 15 and stator 14 in the neutral position or may be taken care of by the initial relative positioning of the rotor and stator of the transformer 41. Relative movement of the rotor 15 and stator 14 will result in the generation of voltages in the winding 42 which will be 180° opposite in phase for relative rotation in opposite directions. The output of the winding 42 increased by the amplifier 46 controls the rotation of the motor 34 in opposite directions depending upon the phase of the voltage generated in the winding 42 which is in turn determined by the direction of relative rotation of the rotor 15 and stator 14. The rotation of the motor 34 will, through the arm 35 and cables 36, control aileron movement.

The control apparatus of Figure 1 is installed in the plane with the axis of rotation of the gyroscopic wheel 3 disposed parallel to the "Y" axis of the plane and with the axis of rotation of the frame 5 disposed parallel to the "Z" axis of the airplane. The shaft 22 and arm 8 are then disposed parallel to the "X" axis of the airplane. the spring 9 serving to bias the frame and gyroscopic wheel to this normal position. The flight direction of the device has been illustrated by the broken arrow and legend in Figure 1. The direction of rotation of the gyroscopic wheel is indicated by a curved arrow and while no means for rotating the wheel has been illustrated in the drawings for the sake of simplicity, it is understood that rotation may be secured by any well known means, electrical or by air blast. To secure the proper movements of the transmitter, rotor and stator for correct aileron movement, the apparatus must be adapted to other characteristics of the plane upon which it can be used. This adaptation may be done in any desired manner as by varying the tension of the spring 9, the speed of rotation of the gyro wheel 3 or the length of the pendulum formed by the rod 23 and weight 24.

The operation of the device will be explained in connection with aircraft movements. Assuming straight level flight and aircraft roll to the right caused, for example, by a wind gust under the left wing, the roll of the airplane is immediately accompanied by a rotation of the frame 5 about its axis according to the well known laws of precession of gyroscopes. Under the conditions illustrated in Figure 1, this precession will rotate the frame 5 in a counterclockwise direction as viewed from the top of Figure 1. Through the shaft 7 rotation of frame 5 will be reflected in rotation of the rotor 15 in a counterclockwise direction relative to the stator 14. This rotation will be reflected in a generation of voltage within the winding 42 which will energize the winding 44 of the motor 34 and effect rotation of the motor to apply corrective aileron control to return the airplane to level flight. As the airplane rolls to the right, the pendulum formed by the weight 24 on rod 23 will tend to remain in a vertical position or a position the resultant of gravity and any other force which may be acting thereon. This will result in a relative movement between the housing 1 and the pendulum as if the rod 23 were rotated in a counterclockwise direction as viewed in Figure 2. This relative movement will be dampened by the rotation of disk 31 in the field of magnet 32 as the rod 23 moves arm 28 to rotate sector 26 and gear wheel 29. The upper portion of the rod 23, through forked arm 17, will rotate the stator 14 of the self-synchronous transmitter 13 in a clockwise direction as viewed from the top in Figures 1 and 2 but through a lesser angle than the movement of the rotor 15 by precession of the gyroscope. Thus, the initial movements of the rotor and stator by the precession of the gyroscope and the action of the pendulum are in opposite directions so that the effects of the voltage generated by their individual movements are additive to apply an initial fast and relatively large correction. As the aileron movement becomes effective to rotate the plane to the left back toward level position, the gyroscopic action will cause precession in the opposite direction to rotate the frame 5 clockwise and through the shaft 7 effect rotation of the rotor 15 clockwise as viewed from the top in Figure 1. As the rotation of the rotor 15 by the gyroscope is greater than the rotation of the stator 14 by the pendulum, the resulting relative position of the rotor and stator will be that of relative rotation in the opposite direction from the neutral point from that initially occasioned. This results in a reversal of phase of the voltage generated in coil 42 and in an energization of the winding 44 so that the motor 34 will reverse its direction of rotation to lessen the aileron correction. However, inasmuch as the movements of the rotor and stator are now in the same direction, a lesser voltage is applied to the motor and the speed of rotation in the opposite direction will be less than the initial rotation to apply the correction. Accordingly, the return of the airplane to level flight is accompanied by a steadily lessened aileron correction until at the instant of level flight the ailerons should be returned to their normal position and the rotor 15 and stator 14 positioned in their voltage null position with the motor 34 de-energized. In the event there should be an overshooting beyond the level flight condition, the condition will be corrected in the same manner as prescribed for the original involuntary roll. However, according to the present invention, the differential action of the gyroscope and pendulum after the initial correction is applied tends to bring the airplane smoothly back to the level flight condition without overshooting.

Another operation of the automatic control occurs when the airplane is turned about its "Z" axis to effect a change of course, for instance by applying rudder. Under this condition the gyroscope is initially inactive since there is no initial movement about the "X" axis of the plane. The pendulum, however, swings out to a fairly wide angle under the action of centrifugal force. This effects rotation of the stator 14 and consequent generation of a voltage in the coil 42 to energize winding 44 and effect rotation of motor 34 to apply corrective aileron to bank the plane. As the plane starts to bank, the precession of the gyroscope occurs to rotate the rotor 15 in the same direction as the stator 14 and through a greater distance to effect a reversal of phase in the energization of the winding 44 of the motor 34. This effects a reverse rotation of the motor to return the ailerons to their neutral position but the return action is effected slower than the initial corrective movement in view of the differential effects of the gyroscope and pendulum. Again the aileron applied lessens as the plane approaches its proper banking position until the proper bank position for the turn is attained in which the pendulum will again be in its normal position under the combined action of gravity and the centrifugal force of the turn with the ailerons returned to their normal position and the motor 34 energized.

In the optional control arrangement shown in Figures 6 and 7 and also included in the wiring diagram of Figure 5, there is provided means whereby the pilot by switch setting may provide for the two way control according to the present invention in which the movement of the ailerons is automatically controlled while the pilot operates only the rudder and elevators, or may provide for conventional three way control in which the ailerons are manually operated, and also, by a further switch setting, may provide for a three way control in which the ailerons are both manually and automatically operated. The conventional three way control may be desired for acrobatic flying, or in order to effect side slip, or in case the automatic control should fail. The operation with both manual and automatic control of the ailerons is advantageous in teaching a student the proper coordination of aileron and rudder movement.

In the representation of Figures 6 and 7, there is provided a conventional control shaft 51 which is both rotatable and longitudinally movable and which is mounted in a column 52 to which the controls of the elevators 53 are connected, the column 52 being pivoted upon a shaft 54. At the end of the shaft 51 is the operating wheel 55 in the hub of which is mounted a control switch 56. Upon the shaft 51 are supported a pair of freely rotatable sprockets 57 and 58 rigidly connected to clutch elements 59 and 61. Keyed to the shaft 51 so as to be rotatable therewith is the clutch member 62 having teeth at the opposite sides thereof alternatively engageable with the teeth of the clutch elements 59 and 61. The clutch member 62 is connected to be moved by a lever 63 pivoted at 64 and connected on one side of the pivot 64 to the armature of a solenoid 65 and at the other side of the pivot 64 to a tension spring 66. Upon the sprocket 57 is disposed a chain 67 serially connected to the aileron control cables and upon the sprocket 58 is mounted a chain 68 serially connected to the cables controlling the rudder 69, with the rudder control cables also connected to the foot pedals 71.

As shown in Figures 5, 6, and 7, the switch 56 is in a position to effect energization of both the solenoid 65 and the automatic aileron control system. With this arrangement, the wheel 55 and shaft 51 are clutched to rotate the sprocket 58 with the sprocket 57 rotating freely on the shaft 51. This is the operating position for two way control with automatic aileron operation as described hereinbefore. The pilot can move the rudder by either rotating the wheel 55 or manipulating the pedals 71 and the aileron control is effected automatically.

If the switch 56 is moved into position to engage the contact 72 only, the solenoid 65 is de-energized but the automatic aileron control system remains energized. In this switch position, there is provided three way control with both manual and automatic control of the ailerons such as might be utilized for student instruction purposes. Here, with the de-energization of solenoid 65, the bias exerted by spring 66 engages the clutch member 62 with the clutch element 59 to positively connect the sprocket 57 to the shaft 51 so that the shaft 51 and the ailerons 37 move together. The sprocket 58 is now freely rotatable on the shaft 51 so that rudder control may be effected only through the pedals 71.

In the third or off position of the switch 56 both the solenoid 65 and the automatic aileron control system are de-energized. This is the standard three way control system with the sprocket 57 connected to the shaft 51 for manual control only of the ailerons by rotation of the wheel 55 and the shaft 51.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. In a control system for automatically moving the ailerons of an airplane to control its flight, a gyroscope normally rotating in a plane parallel to the X and Z axes of the airplane, a pendulum having its axis of rotation disposed parallel to the X axis of the airplane, and electromagnetic means including relatively rotatable windings, the position of which is controlled by precession movement of said gyroscope and swing of said pendulum respectively for energizing motor means for effecting movement of the ailerons of the airplane.

2. In a control system for automatically moving the ailerons of an airplane to control its flight, a gyroscope normally rotating in a plane parallel to the X and Z axes of the airplane, a pendulum having its axis of rotation disposed parallel to the X axis of the airplane, and electromagnetic means including relatively rotatable windings the position of which is controlled by precession movement of said gyroscope and swing of said pendulum respectively for energizing motor means for effecting movement of the ailerons of the airplane, mechanical means respectively interconnecting the gyroscope and pendulum with said rotatable windings so that an initial roll of the plane will cause an initial rapid relative displacement of said windings thus effecting an initial rapid movement of the ailerons to secure the desired change in aircraft attitude and returning the ailerons to their normal position at a progressively decreasing rate under the differential action of the gyroscope and pendulum movements.

3. In a control system for automatically moving the ailerons of an airplane to control its flight, a gyroscope normally rotating in a plane parallel to the X and Z axes of the airplane, means biasing the gyroscope to rotate in its normal position, rotation of the airplane about the X axis being accompanied by precession movement of the gyroscope, a pendulum having its axis of rotation disposed parallel to the X axis of the airplane, rotation of the airplane about the X and Z axes producing swing of the pendulum from the resultant of gravity and centrifugal force, and electromagnetic means including relatively rotatable windings the position of which is controlled by the precession movement of the gyroscope and the swing of the pendulum respectively for energizing motor means for effecting movement of the ailerons of the airplane to place it in the proper flight operating position.

4. In a control system for automatically moving the ailerons of an airplane to control its flight, a gyroscope normally rotating in a plane parallel to the X and Z axes of the airplane, means biasing the gyroscope to rotate in its normal position, rotation of the airplane about the X axis being accompanied by precession movement of the gyroscope, a pendulum having its axis of rotation disposed parallel to the X axis of the airplane, rotation of the airplane about the X or Z axes producing swing of the pendulum from the resultant of gravity and centrifugal force, motor means for effecting movement of the ailerons in opposite directions, and electromagnetic means including relatively movable windings the position of which is controlled by the movements of the gyroscope and pendulum respectively for controlling the magnitude and phase of the motor supply current to determine the direction and speed of movement of said motor means.

5. In a control system for automatically moving the ailerons of an airplane to control its flight, a gyroscope normally rotating in a plane parallel to the X and Z axes of the airplane, means biasing the gyroscope to rotate in its normal position, rotation of the airplane about the X axis being accompanied by precession movement of the gyroscope, a pendulum having its axis of rotation disposed parallel to the X axis of the airplane, rotation of the airplane about the X or Z axes producing swing of the pendulum from the resultant of gravity and centrifugal force, motor means for effecting movement of the ailerons in opposite directions, and electromagnetic means including relatively rotatable windings the position of which is controlled by the movements of the gyroscope and pendulum respectively for controlling the magnitude and phase of the motor supply current to determine the direction and speed of movement of said motor means and operating to effect a rapid movement of the motor and ailerons for correction and returning the ailerons to their normal position at a progressively decreasing rate under the differential action of the gyroscope and pendulum movements.

6. In a control system for automatically moving the ailerons of an airplane to control its flight, a gyroscope normally rotating in a plane parallel to the X and Z axes of the airplane, means biasing the gyroscope to rotate in its normal position, rotation of the airplane about the X axis being accompanied by precession movement of the gyroscope, a pendulum having its axis of rotation disposed parallel to the X axis of the airplane, rotation of the airplane about the X and Z axes producing swing of the pendulum from the resultant of gravity and centrifugal force, motor means for effecting movement of the ailerons in opposite directions, and electromagnetic means including relatively rotatable windings the position of which is controlled by movements of said gyroscope and pendulum respectively for controlling the magnitude and phase of the motor supply current effecting operation of said motor means, roll of the aircraft about the X axis effecting movement of both said gyroscope and pendulum in an additive direction to effect an initial rapid corrective movement of the motor means and ailerons, return of the airplane toward level flight effecting reverse movement of the gyroscope to reverse the direction of movement of the motor means but at a slower speed due to the differential action of the pendulum movement.

7. In a control system for automatically moving the ailerons of an airplane to control its flight, a gyroscope normally rotating in a plane parallel to the X and Z axes of the airplane, means biasing the gyroscope to rotate in its normal position, rotation of the airplane about the X axis being accompanied by precession movement of the gyroscope, a pendulum having its axis of rotation disposed parallel to the X axis of the airplane, rotation of the airplane about the X and Z axes producing swing of the pendulum from the resultant of gravity and centrifugal force, motor means for effecting movement of the ailerons in opposite directions, electromagnetic means including relatively movable windings operated by movement of said gyroscope and pendulum respectively for controlling the magnitude and phase of the current supply to said motor means, rotation of the airplane about its Z axis effecting movement of the pendulum only to effect initial rapid movement of the motor means and ailerons to bank the airplane, rotation of the airplane about its X axis as it banks effecting precession movement of the gyroscope in a direction subtractive to the direction of movement of the pendulum to effect movement of the motor means in the opposite direction to return the ailerons to their normal position at a progressively slower speed under the differential action of the gyroscope and pendulum movements.

8. In a control system for automatically moving the ailerons of an airplane to control its flight, a gyroscope normally rotating in a plane parallel to the X and Z axes of the airplane, means biasing the gyroscope to rotate in its normal position, rotation of the airplane about the X axis being accompanied by precession movement of the gyroscope, a pendulum having its axis of rotation disposed parallel to the X axis of the airplane, rotation of the airplane about the X and Z axes producing swing of the pendulum from the resultant of gravity and centrifugal force, motor means for effecting movement of said ailerons in opposite directions, an electrical control for said motor means including independently rotatable windings, the relative position of which determines the direction and speed of said motor means, means energizing one of said windings from an alternating current supply, means for rotating one of said windings in response to precession movement of said gyroscope, and means for rotating the other of said windings in response to swinging movement of the pendulum.

9. In a control system for automatically moving the ailerons of an airplane to control its flight, a gyroscope normally rotating in a plane parallel to the X and Z axes of the airplane, means biasing the gyroscope to rotate in its normal position, rotation of the airplane about the X axis being accompanied by precession movement of the gyroscope, a pendulum having its axis of rotation disposed parallel to the X axis of the airplane, rotation of the airplane about the X and Z axes producing swing of the pendulum from the resultant of gravity and centrifugal force, motor means for effecting movement of said ailerons in opposite directions, an electrical control for said motor means including independently rotatable windings, the relative position of which determines the direction and speed of said motor means, means energizing one of said windings from an alternating current supply, means for rotating one of said windings in response to precession movement of said gyroscope, and means for rotating the other of said windings in response to swinging movement of the pendulum, said electrical control effecting an algebraic addition of the movements of the gyroscope and pendulum so that the direction and magnitude of the movement of the motor means is determined by the relative magnitudes and directions of the gyroscope and pendulum movements.

10. In a control system for automatically moving the ailerons of an airplane to control its flight, a gyroscope normally rotating in a plane parallel to the X and Z axes of the airplane, means biasing the gyroscope to rotate in its normal position, rotation of the airplane about the X axis being accompanied by precession movement of the gyroscope, a pendulum having its axis of rotation disposed parallel to the X axis of the airplane, rotation of the airplane about the X and Z axes producing swing of the pendulum from the resultant of gravity and centrifugal force, motor means for effecting movement of said ailerons in opposite directions, a transformer for energizing said motor, a self-synchronous transmitter having relatively movable rotor and stator windings, means for energizing one of the windings of said transmitter from an alternating current source, means for energizing said transformer from the other winding of said transmitter, means operatively interconnecting the gyroscope and pendulum with said rotor and stator windings for positioning said windings in response to airplane movement, said transmitter having a null point corresponding to the normal aileron position at which point the motor is deenergized and energizing the motor through the transformer for movement in opposite direction as the transmitter is moved to the opposite sides of the null point, the position of the transmitter windings being controlled by the algebraic sum of the movements of the gyroscope and pendulum.

11. In a control system for automatically moving the ailerons of an airplane to control its flight, a gyroscope normally rotating in a plane parallel to the X and Z axes of the airplane, means biasing the gyroscope to rotate in its normal position, rotation of the airplane about the X axis being accompanied by precession movement of the gyroscope, a pendulum having its axis of rotation disposed parallel to the X axis of the airplane, rotation of the airplane about the X and Z axes producing swing of the pendulum from the resultant of gravity and centrifugal force, a two phase electrical motor connected to effect movement of said ailerons in opposite directions, means for energizing one phase of said motor from an alternating current source, a transformer, means for energizing the other phase of the motor from a said transformer, the energization of said transformer determining the direction and value of the motor phase energization, a self-synchronous transmitter controlling the energization of said transformer, said transmitter including a pair of independently rotatable windings, means for energizing one of the windings of the transmitter from an alternating current source, means for rotating one of the windings of said transmitter in response to movement of the gyroscope, and means for rotating the other winding of said transmitter in response to movement of the pendulum.

FREDERIC F. HAUPTMAN.

REFERENCES CITED

The following references are of record in the file of this patent:

UNITED STATES PATENTS

| Number | Name | Date |
| --- | --- | --- |
| 1,475,869 | Petrie | Nov. 27, 1923 |
| 1,992,086 | Meredith et al. | Feb. 19, 1935 |
| 2,144,614 | Carlson | Jan. 24, 1939 |
| 2,162,862 | Protzen | June 20, 1939 |
| 2,238,300 | Zand | Apr. 15, 1941 |
| 2,340,041 | Carlson | Jan. 25, 1944 |
| 2,394,384 | Horstmann | Feb. 5, 1946 |
| 2,396,951 | Horstmann | Mar. 19, 1946 |
| 2,405,015 | Carlson | July 30, 1946 |
| 2,410,468 | Van Auken et al. | Nov. 5, 1946 |
| 2,415,429 | Kellogg et al. | Feb. 11, 1947 |
| 2,415,430 | Frische et al. | Feb. 11, 1947 |